United States Patent
Lee et al.

(10) Patent No.: US 7,022,259 B2
(45) Date of Patent: Apr. 4, 2006

(54) LIQUID CRYSTAL COMPOUNDS, PREPARATION THEREOF, AND COMPOSITION CONTAINING THE SAME

(75) Inventors: Dao-Hung Lee, Kellung (TW);
Ding-Jen Chen, Chiayi (TW);
Kung-Lung Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 80 days.

(21) Appl. No.: 10/673,440

(22) Filed: Sep. 30, 2003

(65) Prior Publication Data
US 2005/0189515 A1    Sep. 1, 2005

(30) Foreign Application Priority Data
Dec. 26, 2002  (TW) ............................... 91137452 A (51) Int. Cl.
*C09K 19/30* (2006.01)
*C09K 19/32* (2006.01)
*C09K 19/34* (2006.01)
*C07C 69/75* (2006.01)
*C07D 453/02* (2006.01)

(52) U.S. Cl. ........................... 252/299.61; 252/299.62; 252/299.63; 252/299.66; 252/299.67; 546/126; 546/135; 560/79; 560/127

(58) Field of Classification Search ................ 428/1.1; 252/299.5, 299.01, 299.61, 299.62, 299.63, 252/299.66, 299.67; 560/79, 127; 546/126, 546/135
See application file for complete search history.

(56) References Cited

U.S. PATENT DOCUMENTS

| 4,784,793 A | * | 11/1988 | Coates et al. | .......... 252/299.62 |
| 5,401,436 A | | 3/1995 | Takano et al. | ......... 252/299.01 |
| 6,217,792 B1 | * | 4/2001 | Parri et al. | ............. 252/299.61 |

FOREIGN PATENT DOCUMENTS

| WO | WO 01/96494 A1 | 12/2001 |
| WO | WO 02/06195 A1 | 1/2002 |

* cited by examiner

*Primary Examiner*—Shean C. Wu
(74) *Attorney, Agent, or Firm*—Birch, Stewart, Kolasch & Birch, LLP (57) ABSTRACT

A liquid crystal compound with high helical twisting power, a method for preparing the same, and a liquid crystal composition containing the same. The liquid crystal compounds include cyclic group chain structures similar to the liquid crystal to serve as the core structure, and multi-ring structures of natural alcohol with optical activity, such as alcoholates of terpenol, borneol, cinchonidine, quinine, or derivatives thereof. As a result, the liquid crystal composition containing the liquid crystal compounds can filter out light of specific wavelengths from incident light due to optical activity and high helical twisting power thereof.

15 Claims, 3 Drawing Sheets

LIQUID CRYSTAL COMPOUNDS, PREPARATION THEREOF, AND COMPOSITION CONTAINING THE SAME

This nonprovisional application claims priority under 35 U.S.C. § 119(a) on Patent Application Ser. No. 091137452 filed in TAIWAN on Dec. 26, 2002, which is herein incorporated by reference.

BACKGROUND OF THE INVENTION

1. Field of the Invention

The present invention relates to liquid crystal compounds, and more particularly to compositions containing the liquid crystal compounds.

2. Description of the Related Art

Reflective cholesteric liquid crystal displays have advantages of high contrast, high luminance, increased view angle, flicker-free image, and low power consumption, and high reflectivity for incident light of various wavelengths. Power consumption is 2% or less, an improvement on transparent liquid crystal displays.

In use, cholesteric liquid crystals retain image memory even without power supply, significantly reducing power consumption, consuming power only when refreshing, thereby demonstrating suitability for outdoor display or portable electronic devices.

Currently predominant is the transparent LCD type, essentially comprising a polarizer film, a color filter, and a backlight module, all contributing to higher manufacturing costs and device thickness than cholesteric liquid crystal display, which, with higher optical activity, selective light scattering and circular diachronism for liquid crystal composition, requires no polarizer film or color filter. Furthermore, the reflective cholesteric LCD without backlight module provides higher contrast and enhanced brightness under environmental light, even in sunlight. Compared to the conventional transparent LCD, the total manufacturing cost of cholesteric LCD can be reduced by about 30%.

Cholesteric liquid crystals can reflect light through Bragg reflection, because the cholesteric helix is a periodic structure. Light inside the material of wavelength equal to the pitch of the liquid crystal is reflected, provided it has circular polarization of the same orientation as the helix, and light propagation direction is along the helical axis. The bandwidth of wavelength for difference light reflected through common cholesteric liquid crystal molecule is, however, about 40~50 nm, an unsuitable condition for LCD use with wavelength range for visible light from 400 to 700 nm. It is thus important to improve the structure of cholesteric liquid crystal molecules to meet the requirements of wider reflected wavelength range.

According to the Bragg reflection rule, the relationship between wavelength ($\lambda$) of cholesteric liquid crystal, average refraction ratio ($n_{ave}$) of thin film, and helical pitch (P) of cholesteric liquid crystal molecule is:

$$\lambda = n_{ave} \times P$$

The reflection bandwidth ($\Delta\lambda$) relates to the birefringence ($\Delta n$) and helical pitch (P) of cholesteric liquid crystal molecules, according to the relationship equation:

$$\Delta\lambda = \Delta n \times P$$

Accordingly, the reflected wavelength relates to the helical pitch (P) and optical anisotropic properties (birefringence) of the liquid crystal molecule. The cholesteric liquid crystal is composed of optically active chiral compound and nematic liquid crystal, with helical pitch controlled by the ratio therebetween. The relationship between helical pitch and amount of optically active chiral compound is:

$$HTP = (P \times C)^{-1}$$

In the above relational formula, C represents the weight concentration of optically active chiral compound added to the liquid crystal composition and HTP helical twisting power, that is, the twisting and rotating ability of liquid crystal molecules. In general, the common chiral molecule has HTP below 15 $\mu m^{-1}$.

H. -G. Kuball disclosed in 1995 that the value of HTP is based on the species of optically active functional group, number of chiral centers, and specific rotation. Thereby, the chiral compound can be designed to be more asymmetrical by represents of the accession of cyclic groups to increase HTP. Therefore, drawing large specific rotation, numerous chiral centers, and high helical twisting power cyclic groups into the structure of chiral compounds to improve reflection bandwidth of cholesteric liquid crystals is an important focus of research.

In addition, owing to the special helical structure of optically active chrial compound, solubility of chiral compound in the nematic liquid crystal deteriorates as weight concentration of chiral compound increases (such as more than 10 wt %), limiting the weight concentration of optically active chiral molecules.

SUMMARY OF THE INVENTION

Accordingly, an object of the present invention is to provide liquid crystal compounds to filter out light with specific wavelength from incident light due to optical activity and high helical twisting power thereof.

Another object of the present invention is to provide ester liquid crystal compounds, comprising compounds prepared from multi-ring natural alcohols with optical activity as follows:

terpenol   cinchonidine borneol

-continued quinine

In order to achieve the above mentioned objects, the liquid crystal compounds with optical activity having high helical twisting power comprise the structures represented by formula (I) or formula (II).

Formula (I) is

Wherein

A can be the natural multi-ring alcoholates selected from terpenol, borneol, cinchonidine, Quinine, or derivatives thereof;

$R_1$ is hydrogen, alkyl, thioalkyl, or alkyloxy group, wherein alkyl, thioalkyl, and alkyloxy group can be straight or branched and have 1 to 10 carbon atoms optionally substituted with at least one fluorine atom;

n is 1, 2, or 3; and

G can be the same or different and is unsubstituted or substituted cycloalkyl, heterocyclic, aryl, heteroaryl, arylalkyl, or heteroarylalkyl group, and can be optionally substituted with at least one fluorine atom, alkyl or alkyloxy.

Formula (II) is wherein

A can be the same or different natural multi-ring alcoholates selected from terpenol, borneol, cinchonidine, Quinine, or derivatives thereof;

n is 1, 2, or 3; and

G can be the same or different and is unsubstituted or substituted cycloalkyl, heterocyclic, aryl, heteroaryl, arylalkyl, or heteroarylalkyl group, and can be optionally substituted with at least one fluorine atom, alkyl, or alkoxy group.

A feature of the present invention is the particular design of structure for liquid crystal compounds in order to obtain high helical twisting power. The liquid crystal compounds comprise cyclic group chain structures similar with the liquid crystal to serve as the core structure and the multi-ring structures of natural alcohol with optical activity, such as alcoholates of terpenol, borneol, cinchonidine, quinine, or derivatives thereof.

The intent of the disclosed characteristics is to maintain core structure of liquid crystal compounds similar to that of nematic liquid crystal and drawing multi-ring natural product structure with high specific rotation, numerous chiral centers, and high HTP, such as low polar cyclic aliphatic group, into the liquid crystal compounds. When the liquid crystal compounds mix with nematic liquid crystal as a liquid crystal composition, the probability of bonding between the liquid crystal compounds and the liquid crystal composition by hydrogen bond can be reduced, to lower viscosity and response time of the liquid crystal composition.

The present invention also provides a method of preparing liquid crystal compounds with optical activity having high helical twisting power according to formula (I). The method relates to providing an organic acid compound according to formula (III) to react with a natural alcohol with optical activity to undergo esterification.

Formula (III) is wherein $R_1$ is hydrogen, alkyl, thioalkyl, or alkyloxy group, wherein alkyl, thioalkyl, and alkyloxy group can be straight or branched and have 1 to 10 carbon atoms optionally substituted with at least one fluorine atom;

n is 1, 2, or 3; and

G can be the same or different and is unsubstituted or substituted cycloalkyl, heterocyclic, aryl, heteroaryl, arylalkyl, or heteroarylalkyl group, and can be optionally substituted with at least one fluorine atom, alkyl, or alkoxy group.

The reactions of the above are shown below

A-H is a natural alcohol with optical activity having multi-ring structure, and can be terpenol, borneol, cinchonidine, quinine, or derivatives thereof.

A is an alcoholate of natural alcohol having multi-ring structure and can be alcoholates of terpenol, borneol, cinchonidine, quinine, or derivatives thereof; and $R_1$, n and G are defined as above.

The present invention also provides a method of preparing liquid crystal compounds with optical activity having high helical twisting power according to formula (II). The method provides an organic acid compound according to formula (IV) to react with a natural alcohol with optical activity having multi-ring structure to undergo esterification.

Formula (IV) is wherein n is 1, 2, or 3; and G can be the same or different and is unsubstituted or substituted cycloalkyl, heterocyclic, aryl, heteroaryl, arylalkyl, or heteroarylalkyl group, and can be optionally substituted with at least one fluorine atom, alkyl, or alkoxy group.

The reaction equations as described above are shown below.

Wherein

A-H can be the same or different and is a natural alcohol with optical activity having multi-ring structure, selected from terpenol, borneol, cinchonidine, quinine, or derivatives thereof;

A can be the same or different and is an alcoholate of natural alcohol having multi-ring structure, selected from alcoholates of terpenol, borneol, cinchonidine, quinine, or derivatives thereof; and n and G are defined as above.

In addition, another feature of the present invention is use of organic acid having similar core structure to liquid crystal reacting with multi-ring natural alcohol with optical activity, such as terpenol, borneo, inchonidine, or quinine, to obtain liquid crystal compounds with high helical twisting power through simple esterifications. The esterification has advantages of controllable and high reactivity and simple purification. Therefore, it is easy to prepare liquid crystal compounds with high helical twisting power using esterification.

Moreover, the multi-ring natural alcohols with optical activity used in the esterification are the usual mono-alcoholic natural products, such as terpenol, borneo, cinchonidine, quinine, or derivatives thereof, all with very high specific rotation of about 22~70°. Furthermore, these mono-alcoholic natural products are commonly used industrially, translating to easily acquired raw materials in quantity.

Overall, liquid crystal compounds having the multi-ring natural alcohol structure not only have better optical properties and purity and higher helical twisting power, but also economy of production. Especially, they can develop novel liquid crystal composition for LCD by mixture with other species of liquid crystal compounds.

The present invention also provides a liquid crystal composition comprising optically active liquid crystal compounds with high helical twisting power, wherein the optically active liquid crystal compounds are represented by formula (I) or formula (II). The liquid crystal composition according to the present invention comprises, first, at least one liquid crystal compound represented by formula (I) or formula (II) at a ratio from 3 wt % to 30 wt %, based on the weight of the liquid crystal composition, and liquid crystal at a ratio from 3 wt % to 97 wt %, based on the weight of the liquid crystal composition, wherein the liquid crystal is different from the liquid crystal compounds represented by formula (I) or formula (II).

Preferably, the component represented by formula (I) or formula (II) of the liquid crystal composition according to the present invention is present at a ratio from 5 wt % to 20 wt %, based on the weight of the liquid crystal composition.

The liquid crystal compounds with optical activity represented by formula (I) or formula (II) present high helical twisting power, low temperature dependance, and high resistance to light, and are very suitable to mix with a liquid crystal to prepare liquid crystal compositions meeting requirements for liquid crystal displays, such as TN-LCD, STN-LCD, SSTN-LCD, and TFT-LCD. Furthermore, the liquid crystal compositions can be materials to form cholesteric liquid crystal reflective polarizer or color filter. For example, the liquid crystal compounds with reactive double bonds, such as compound C1·C2·C3·Q1·Q2 and Q3 described below, can be polymerized with reactive type liquid crystal to prepare the polarizer or color filter suitable for liquid crystal display.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

The present invention can be more fully understood by reading the subsequent detailed description and examples with references made to the accompanying drawings, wherein.

DETAILED DESCRIPTION OF THE INVENTION

The liquid crystal compounds with optical activity having high helical twisting power according to the present invention can be multi-ring organic esters with optical activity represented by formula (I) comprising compound T1, T2, and T3 within the structure of optically active terpenol natural product, compound B1, B2, and B3 within the structure of optically active borneol natural product, compound C1, C2, and C3 within the structure of optically active cinchonidine natural product, and compound Q1, Q2, and Q3 within the structure of optically active quinine natural product.

T1

T2

T3

B1

B2

B3

C1

C2

-continued

C3

Q1

Q2

Q3

The liquid crystal compounds with optical activity having high helical twisting power according to the present invention can also be multi-ring organic esters with optical activity represented by formula (II) comprising compound T4 within the structure of optically active terpenol natural product, and compound B4 within the structure of optically active borneol natural product.

T4

-continued

B4

The organic acid according to the present invention can be an organic acid having similar core structure to liquid crystal represented by formula (III) or formula (IV), such as benzoic acid, cyclohexanecarboxylic acid, biphenyl carboxylic acid, para-cyclohexane-dicarboxylic acid, terephthalic acid, 4-n-hexyloxy-benzoic acid · 4-n-propyl-cyclohexanecarboxylic acid, 4-decyloxy-biphenyl-4-carboxylic acid, cyclohexane-1,4-dicarboxylic acid, or derivatives thereof.

In one aspect of the present invention, the method of preparing liquid crystal compounds represented by formula (I) comprises providing an organic acid, such as 4-n-Hexyloxy-benzoic acid, to react with terpenol, borneol, cinchonidine, and quinine respectively to obtain compound T1, B1, C1, and Q1 via esterifications, referring to the reactions as shown below.

T1

B1

C1

-continued

Q1

In another aspect of the present invention, the method of preparing liquid crystal compounds represented by formula (I) comprises providing an organic acid, such as 4-n-Propyl-cyclohexanecarboxylic acid, to react with terpenol, borneol, cinchonidine, and quinine respectively to obtain compound T2, B2, C2, and Q2 via esterifications, referring to the reactions as shown below.

T2

B2

C2

Q2

In yet another aspect of the present invention, the method of preparing liquid crystal compounds represented by formula (I) comprises providing an organic acid, such as 4'-Decyloxy-biphenyl-4-carboxylic acid to react with terpenol, borneol, cinchonidine, and quinine respectively to obtain compound T3, B3, C3, and Q3 via esterifications, referring to the reactions as shown below.

In still another aspect of the present invention, the method of preparing liquid crystal compounds represented by formula (II) comprises providing an organic acid, such as cyclohexane-1,4-dicarboxylic acid to react with terpenol, and borneol respectively to obtain compound T4 and B4 via esterifications, referring to the reactions as shown below.

-continued

In the present invention, the liquid crystal composition comprises a component of at least one liquid crystal compound represented by formula (I) or formula (II), preferably compound T1, T2, T3, B1, B2, B3, C1, C2, C3, Q1, Q2, Q3, T4 or B4.

The following embodiments are intended to illustrate the invention more fully without limiting their scope, since numerous modifications and variations will be apparent to those skilled in this art.

Preparation of Liquid Crystal Compound

The method of preparing liquid crystal compounds represented by formula (I) and formula (II) are described in detail through Examples 1 to 14.

The helical pitch (P) of liquid crystal compounds can be found by testing as follows. First, a liquid crystal compound according to the present invention (1% by weight) was added to a liquid crystal composition "ZLI-1132" (a commercially available product manufactured by Merck Company) to prepare a chiral nematic liquid crystal composition. This composition was filled in a wedge type cell subjected to a parallel treatment, followed by observing the resulting cell under a polarizing microscope, such as Olympus MX50 polarizing microscope. As a result, the resulting helical pitch was observed as follows.

The helical twisting power can be calculated from the helical pitch (P) of liquid crystal compound using the formula $HTP=(P \times C)^{-1}$.

EXAMPLE 1

Synthesis of T1

In a nitrogen atmosphere, a mixture of 1.0 g of terpenol, 1.46 g of 4-n-Hexyloxy-benzoic acid, 1.36 g of N,N'-dicyclohexyl carbodimide (DCC), 0.80 g of N,N-(dimethyl amino)-pyridine (DMAP) and 80 ml of dichloromethane was added into a round-bottom flask at room temperature. After mixing completely for 60 minutes, the resulting mixture was heated to reflux for 24 hours with stirring. After cooling, the resulting mixture was subjected to extraction with water and $CH_2Cl_2$, dried over anhydrous $MgSO_4$, filtered, and condensed. The residue was subjected to purification by column chromatography from a mixed solvent (EA:n-hexane=1:3), giving [(4S)-4-isopropenyl-1-cyclohexenyl]methyl 4-(hexyloxy) benzoate, a liquid crystal compound according to the present invention, as a white solid having a melting point about 45–46° C. in a 38% yield. The compound exhibited a specific rotation [α] of −81.27 and a helical pitch P of 84.6 μm, and helical twisting power (HTP) value thereof is 1.18 $\mu m^{-1}$.

EXAMPLE 2

Synthesis of T2

Example 2 was performed as Example 1 except for substitution of 1.0 g of terpenol, 1.3 g of 4-n-Propyl-cyclohexane-carboxylic acid, 1.61 g of N,N'-Dicyclohexyl carbodimide (DCC), 1.0 g of N,N-(dimethyl amino)-pyridine (DMAP) and 80 ml of dichloromethane into a round-bottom flask. After filtering and condensing, the residue was subjected to purification by column chromatography from a mixed solvent (EA:n-hexane=1:20), giving [(4S)-4-isopropenyl-1-cyclohexenyl]methyl 4-(hexyloxy) benzoate, as a white solid in a 32.4% yield. The optical properties of the resulting compound were tested as in Example 1. The compound exhibited a specific rotation [α] of −52.4 and a helical pitch P of 80.9 μm, with helical twisting power of 1.24 μm$^{-1}$.

EXAMPLE 3

Synthesis of T3

Example 3 was performed as Example 1 except for substitution of 0.47 g of terpenol, 1.0 g of 4'-Decyloxy-biphenyl-4-carboxylic acid, 0.71 g of N,N'-Dicyclohexyl carbodimide (DCC), 0.42 g of N,N-(dimethyl amino)-pyridine (DMAP) and 80 ml of dichloromethane into a round-bottom flask. After filtering and condensing, the residue was subjected to recrystallization from methanol/hexane, giving [(4S)-4-isopropenyl-1-cyclohexenyl]-4-(decyloxy)-biphenyl benzoate, as a white solid having a melting point about 45–46° C. The optical properties of the resulting compound were tested as in Example 1. The compound exhibited a specific rotation [α] of −31.03 and a helical pitch P of 75.7 μm, with helical twisting power of 1.32 μm$^{-1}$.

EXAMPLE 4

Synthesis of T3

Example 4 was performed as Example 1 except for substitution of 0.97 g of terpenol, 0.5 g of Cyclohexane-1,4-dicarboxylic acid, 1.38 g of N,N'-Dicyclohexyl carbodimide (DCC), 0.82 g of N,N-(dimethyl amino)-pyridine (DMAP) and 80 ml of dichloromethane into a round-bottom flask. After filtering and condensing, the residue was subjected to purification by column chromatography from a mixed solvent (EA:n-hexane=1:5), giving di[(4S)-4-isopropenyl-1-cyclohexenyl]1,4-cyclohexanedicarboxylate, as a white solid having a melting point about 89° C. in a 18.11% yield. The optical properties of the resulting compound were tested as in Example 1. The compound exhibited a specific rotation [α] of −66.1 and a helical pitch P of 50.5 μm, with helical twisting power of 1.98 μm$^{-1}$.

EXAMPLE 5

Synthesis of B1

Example 5 was performed as Example 1 except for substitution of 0.76 g of L-borneol, 1.0 g of 4-n-hexyloxy-benzoic acid, 1.11 g of N,N'-Dicyclohexyl carbodimide (DCC), 0.68 g of N,N-(dimethyl amino)-pyridine (DMAP) and 80 ml of dichloromethane into a round-bottom flask. After filtering and condensing, the residue was subjected to purification by column chromatography from a mixed solvent (EA:n-hexane=1:4), giving (1S,2R,4S)-4,7,7-trimethylbicyclo[2.2.1] hept-2-yl-4-(hexyloxy) benzoate, as a white solid in a 74.53% yield. The optical properties of the resulting compound were tested as in Example 1. The compound exhibited a specific rotation [α] of −25.7 and a helical pitch P of 8.2 μm, with helical twisting power of 12.23 μm$^{-1}$.

EXAMPLE 6

Synthesis of B2

Example 6 was performed as Example 1 except for substitution of 1.0 g of L-borneol, 1.28 g of 4-n-Propyl-cyclohexanecarboxylic acid, 1.61 g of N,N'-Dicyclohexyl carbodimide (DCC), 0.95 g of N,N-(dimethyl amino)-pyridine (DMAP) and 80 ml of dichloromethane into a round-bottom flask. After filtering and condensing, the residue was subjected to recrystallization from a mixed solvent (CH$_2$Cl$_2$: methanol=1:3), giving (1S,2R,4S)-4,7,7-trimethylbicyclo[2.2.1]hept-2-yl 4-propyl-1-cyclohexanecarboxylate, as a white solid in a 21.36% yield. The optical properties of the resulting compound were tested as in Example 1. The compound exhibited a specific rotation [α] of −22.82 and a helical pitch P of 11.8 μm, with helical twisting power of 8.45 μm$^{-1}$.

EXAMPLE 7

Synthesis of B3

Example 7 was performed as Example 1 except for substitution of 1.0 g of L-borneol, 1.28 g of 4'-Decyloxy-biphenyl-4-carboxylic acid, 1.61 g of N,N'-Dicyclohexyl carbodimide (DCC), 0.95 g of N,N-(dimethyl amino)-pyridine (DMAP) and 80 ml of dichloromethane into a round-bottom flask. After filtering and condensing, the residue was subjected to recrystallization from a mixed solvent (CH$_2$Cl$_2$: methanol=1:3), giving (1S,2R,4S)-4,7,7-trimethylbicyclo[2.2.1]hept-2-yl 4-(decyloxy)-biphenylbenzoate, as a white solid in a 48.32% yield. The optical properties of the resulting compound were tested as in Example 1. The compound exhibited a specific rotation [α] of −18.94 and a helical pitch P of 10.2 μm, with helical twisting power of 9.85 μm$^{-1}$.

EXAMPLE 8

Synthesis of B4

Example 8 was performed as Example 1 except for substitution of 0.99 g of L-borneol, 0.5 g of cyclohexane-1,4-dicarboxylic acid, 1.38 g of N,N'-Dicyclohexyl carbodimide (DCC), 0.82 g of N,N-(dimethyl amino)-pyridine (DMAP) and 80 ml of dichloromethane into a round-bottom flask. After filtering and condensing, the residue was subjected to recrystallization from a mixed solvent (CH$_2$Cl$_2$: methanol=4:7), giving di[(1S,2R,4S)-4,7,7-trimethylbicyclo

[2.2.1]hept-2-yl]1,4-cyclohexanedicarboxylate, as a white solid having a melting point about 77° C. in a 82% yield. The optical properties of the resulting compound were tested as in Example 1. The compound exhibited a specific rotation [α] of −21.33 and a helical pitch P of 13.5 μm, with helical twisting power of 7.39 μm$^{-1}$.

EXAMPLE 9

Synthesis of C1

Example 9 was performed as Example 1 except for substitution of 2.91 g of cinchonidine, 2.0 g of 4-n-hexyloxy-benzoic acid, 2.33 g of N,N'-Dicyclohexyl carbodimide (DCC), 1.32 g of N,N-(dimethyl amino)-pyridine (DMAP) and 80 ml of dichloromethane into a round-bottom flask. After filtering and condensing, the residue was subjected to recrystallization from methanol, giving (R)-1-(4-quinolyl)-1-[(2S,4S,5R)-5-vinyl-1-azabicyclo[2.2.2]oct-2-yl]methyl 4-(hexyloxy)benzoate, as a white solid having a melting point about 70° C. in a 72.3% yield. The optical properties of the resulting compound were tested as in Example 1. The compound exhibited a specific rotation [α] of +57.59 and a helical pitch P of 5.1 μm, with helical twisting power of 19.7 μm$^{-1}$.

EXAMPLE 10

Synthesis of C2

Example 10 was performed as Example 1 except for substitution of 2.7 g of cinchonidine, 1.5 g of 4-n-Propyl-cyclohexanecarboxylic acid, 2.1 g of N,N'-Dicyclohexyl carbodimide (DCC), 1.2 g of N,N-(dimethyl amino)-pyridine (DMAP) and 80 ml of dichloromethane into a round-bottom flask. After filtering and condensing, the residue was subjected to recrystallization from methanol, giving (R)-1-(4-quinolyl)-1-[(2S,4S,5R)-5-vinyl-1-azabicyclo[2.2.2] oct-2-yl]methyl 4-propyl-1-cyclohexanecarboxylate, as a white solid with a chemical purity 91.31%. The optical properties of the resulting compound were tested as in Example 1. The compound exhibited a specific rotation [α] of +5.52 and a helical pitch P of 3.1 μm, with helical twisting power of 32.2 μm$^{-1}$.

EXAMPLE 11

Synthesis of C3

Example 11 was performed as Example 1 except for substitution of 1.83 g of cinchonidine, 2.0 g of 4'-Decyloxy-biphenyl-4-carboxylic acid, 1.4 g of N,N'-Dicyclohexyl carbodimide (DCC), 0.83 g of N,N-(dimethyl amino)-pyridine (DMAP) and 80 ml of dichloromethane into a round-bottom flask. After filtering and condensing, the residue was subjected to recrystallization from methanol, giving (R)-1-(4-quinolyl)-1-[(2S,4S,5R)-5-vinyl-1-azabicyclo[2.2.2]oct-2-yl]methyl 4-(decyloxy)biphenylbenzoate, as a white solid having a melting point about 81° C. in a 29% yield. The optical properties of the resulting compound were tested as in Example 1. The compound exhibited a specific rotation [α] of +105.96 and a helical pitch P of 2.8 μm, with helical twisting power of 35.5 μm$^{-1}$.

EXAMPLE 12

Synthesis of Q1

Example 12 was performed as Example 1 except for substitution of 1.61 g of quinine, 1.0 g of 4-n-hexyloxy-benzoic acid, 1.11 g of N,N'-Dicyclohexyl carbodimide (DCC), 0.66 g of N,N-(dimethyl amino)-pyridine (DMAP) and 80 ml of dichloromethane into a round-bottom flask. After filtering and condensing, the residue was subjected to purification by column chromatography from ethyl acetate, giving (R)-1-(6-methoxy-4-quinolyl)-1-[(2S,4S,5R)-5-vinyl-1-azabicyclo[2.2.2]oct-2-yl]methyl-4-(hexyloxy)-benzoate, as a white solid with a chemical purity 90.1% in a 19.1% yield. The optical properties of the resulting compound were tested as in Example 1. The compound exhibited a specific rotation [α] of +12.07 and a helical pitch P of 4.5 μm, with helical twisting power of 22.2 μm$^{-1}$.

EXAMPLE 13

Synthesis of Q2

Example 13 was performed as Example 1 except for substitution of 2.97 g of quinine, 1.5 g of 4-n-Propyl-cyclohexanecarboxylic acid, 2.1 g of N,N'-Dicyclohexyl carbodimide (DCC), 1.22 g of N,N-(dimethyl amino)-pyridine (DMAP) and 80 ml of dichloromethane into a round-bottom flask. After filtering and condensing, the residue was subjected to recrystallization from a mixed solvent (CH$_2$Cl$_2$:methanol=1:3), giving (R)-1-(6-(R)-1-(6-methoxy-4-quinolyl)-1-[(2S,4S,5R)-5-vinyl-1-azabicyclo [2.2.2]oct-2-yl]methyl-4-propyl-1-cyclohexanecarboxylate, as a white solid with a chemical purity 97.2% in a 10% yield. The optical properties of the resulting compound were tested as in Example 1. The compound exhibited a specific rotation [α] of +9.27 and a helical pitch P of 2.82 μm, with helical twisting power of 35.46 μm$^{-1}$.

EXAMPLE 14

Synthesis of Q3

Example 14 was performed as Example 1 except for substitution of 1.0 g of quinine, 1.0 g of 4'-Decyloxy-biphenyl-4-carboxylic acid, 0.7 g of N,N'-Dicyclohexyl carbodimide (DCC), 0.41 g of N,N-(dimethyl amino)-pyridine (DMAP) and 80 ml of dichloromethane into a round-bottom flask. After filtering and condensing, the residue was subjected to recrystallization from a mixed solvent (CH$_2$Cl$_2$:methanol=1:3), giving (R)-1-(6-(R)-1-(6-methoxy-4-quinolyl)-1-[(2S,4S,5R)-5-vinyl-1-azabicyclo[2.2.2]oct-2-yl]methyl 4-propyl-1-cyclohexanecarboxylate, as a white solid in a 35.8% yield. The optical properties of the resulting compound were tested as in Example 1. The compound exhibited a specific rotation [α] of +15.76 and a helical pitch P of 1.7 μm, with helical twisting power of 59.1 μm$^{-1}$.

The results of optical properties for liquid crystal compounds as described in Examples 1 to 14 are shown in Table 1.

TABLE 1

Helical pitch and HTP value of Liquid crystal compounds as described in Examples 1 to 14

| | Terpene | Borneol | Cinchonidine |
|---|---|---|---|
| HOOC—⟨phenyl⟩—OC$_6$H$_{13}$ | Pitch = 84.6 μm<br>HTP = 1.18<br>[α] = −81.27 | Pitch = 8.2 μm<br>HTP = 12.23<br>[α] = −25.7 | Pitch = 5.1 μm<br>HTP = 19.7<br>[α] = +57.59 |
| HOOC—⟨cyclohexyl⟩—C$_3$H$_7$ | Pitch = 80.9 μm<br>HTP = 1.24<br>[α] = −52.4 | Pitch = 11.8 μm<br>HTP = 8.45<br>[α] = −22.82 | Pitch = 3.1 μm<br>HTP = 32.2<br>[α] = +5.52 |
| HOOC—⟨biphenyl⟩—O(CH$_2$)$_3$CH$_3$ | Pitch = 75.7 μm<br>HTP = 1.32<br>[α] = −31.03 | Pitch = 10.2 μm<br>HTP = 9.85<br>[α] = −18.94 | Pitch = 2.8 μm<br>HTP = 35.5<br>[α] = +105.96 |
| HOOC—⟨cyclohexyl⟩—COOH | Pitch = 50.5 μm<br>HTP = 1.98<br>[α] = −66.1 | Pitch = 13.5 μm<br>HTP = 7.39<br>[α] = −21.33 | |

| | Quinine |
|---|---|
| HOOC—⟨phenyl⟩—OC$_6$H$_{13}$ | Pitch = 4.5 μm<br>HTP = 22.2<br>[α] = +12.07 |
| HOOC—⟨cyclohexyl⟩—C$_3$H$_7$ | Pitch = 2.82 μm<br>HTP = 35.46<br>[α] = +9.27 |
| HOOC—⟨biphenyl⟩—O(CH$_2$)$_3$CH$_3$ | Pitch = 1.7 μm<br>HTP = 59.1<br>[α] = +15.76 |
| HOOC—⟨cyclohexyl⟩—COOH | |

Preparation of Liquid Crystal Composition

The liquid crystal compound with the HTP value more than 15 µm$^{-1}$ as described above, such as compound Q3, is provided to process solubility tests and mix with various nematic liquid crystals to prepare liquid crystal compositions with a peak reflected wavelength about 560 nm. According to the present invention, suitable nematic liquid crystal can be ZLI-5100-100, ZLI-5200-100, ZLI-5400-100, MLC-6657-100, MLC-6700-100 (Trademark, liquid crystal product sold by E. Merck, Germany), or RPD-88873 (Trademark, liquid crystal product sold by Dic). The processes and results are described in detail through Examples 15 to 20.

EXAMPLE 15

Liquid Crystal Composition (A)

Figure 1:
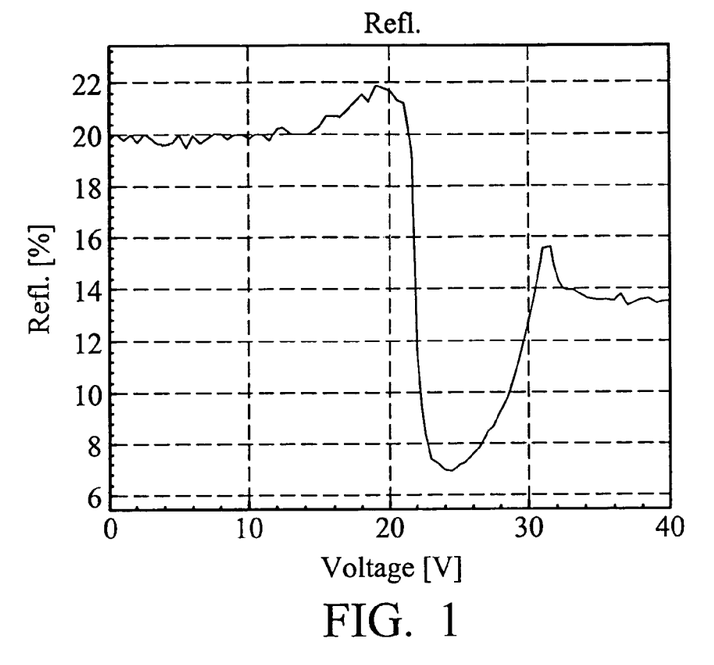
FIG. 1 is a graph plotting reflectivity against voltage of a display as disclosed in Example 15 at a measured reflected wavelength of 560 nm.

The liquid crystal composition (A) with a selectively reflected wavelength 560 nm was obtained by uniformly mixing 90 parts by weight of a commercially available nematic liquid crystal, ZLI-5100-100 (available from E. Merck, Germany) and 10 parts by weight of the compound Q3 of the present invention prepared in Example 14. Afterward, the liquid crystal composition (A) filled a PDA having a 2-inch diagonal display (manufactured by Picvue Electronics, Ltd) to distinguish the exact relationship between reflectivity and operational voltage at a measuring wavelength of 560 nm. The result is shown in FIG. 1.

EXAMPLE 16

Liquid Crystal Composition (B)

The liquid crystal composition (B) with a selectively reflected wavelength 560 nm was obtained by uniformly mixing 86.5 parts by weight of a commercially available nematic liquid crystal, ZLI-5200-100 (available from E. Merck, Germany) and 13.5 parts by weight of the compound Q3 of the present invention prepared in Example 14.

Figure 2:
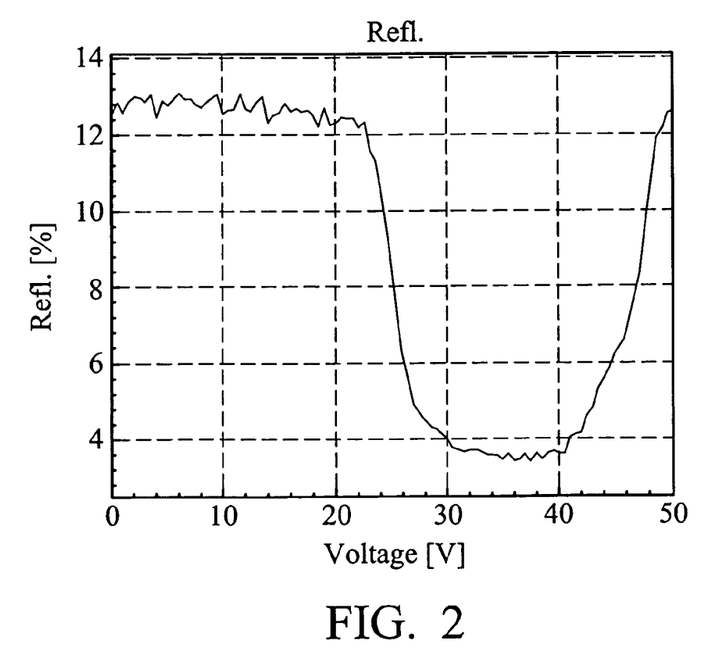
FIG. 2 is a graph plotting reflectivity against voltage of a display as disclosed in Example 16 at a measured reflected wavelength of 560 nm.

The relationship between reflectivity and operational voltage of the resulting composition was distinguished as in Example 15, and the result is shown in FIG. 2.

EXAMPLE 17

Liquid Crystal Composition (C)

The liquid crystal composition (C) with a selectively reflected wavelength 560 nm was obtained by uniformly mixing 88 parts by weight of a commercially available nematic liquid crystal, ZLI-5400-100 (available from E. Merck, Germany) and 12 parts by weight of the compound Q3 of the present invention prepared in Example 14.

Figure 3:
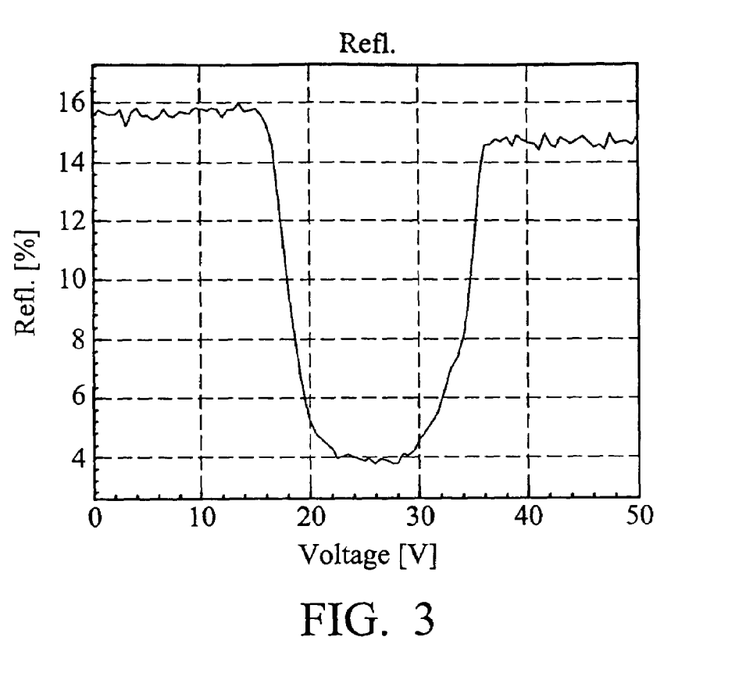
FIG. 3 is a graph plotting reflectivity against voltage of a display as disclosed in Example 17 at a measured reflected wavelength of 560 nm.

The relationship between reflectivity and operational voltage of the resulting composition was distinguished as in Example 15, and the result is shown in FIG. 3.

EXAMPLE 18

Liquid Crystal Composition (D)

The liquid crystal composition (D) with a selectively reflected wavelength 560 nm was obtained by uniformly mixing 87.78 parts by weight of a commercially available nematic liquid crystal, MLC-6657-100 (available from E. Merck, Germany) and 12.22 parts by weight of the compound Q3 of the present invention prepared in Example 14.

Figure 4:
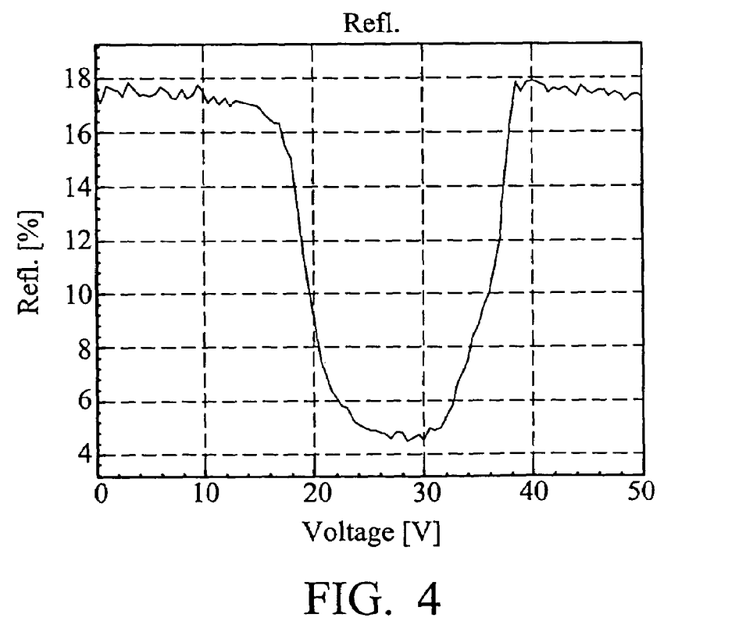
FIG. 4 is a graph plotting reflectivity against voltage of a display as disclosed in Example 18 at a measured reflected wavelength of 560 nm.

The relationship between reflectivity and operational voltage of the resulting composition was distinguished as in Example 15, and the result is shown in FIG. 4.

EXAMPLE 19

Liquid Crystal Composition (E)

Figure 5:
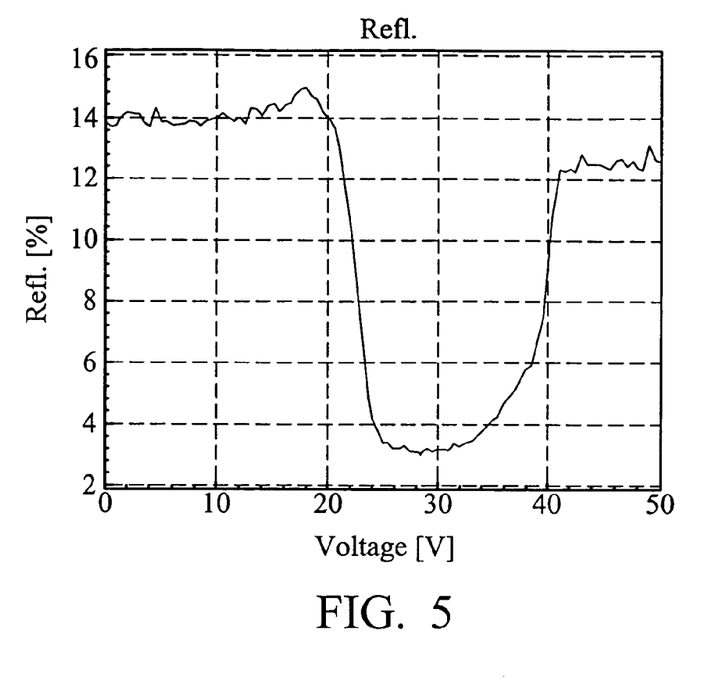
FIG. 5 is a graph plotting reflectivity against voltage of a display as disclosed in Example 19 at a measured reflected wavelength of 560 nm.

The liquid crystal composition (E) with a selectively reflected wavelength 560 nm was obtained by uniformly mixing 87.78 parts by weight of a commercially available nematic liquid crystal, MLC-6657-100 (available from E. Merck, Germany) and 11.38 parts by weight of the compound Q3 of the present invention prepared in Example 14. The relationship between reflectivity and operational voltage of the resulting composition was distinguished as in Example 15, and the result is shown in FIG. 5.

EXAMPLE 20

Liquid Crystal Composition (F)

Figure 6:
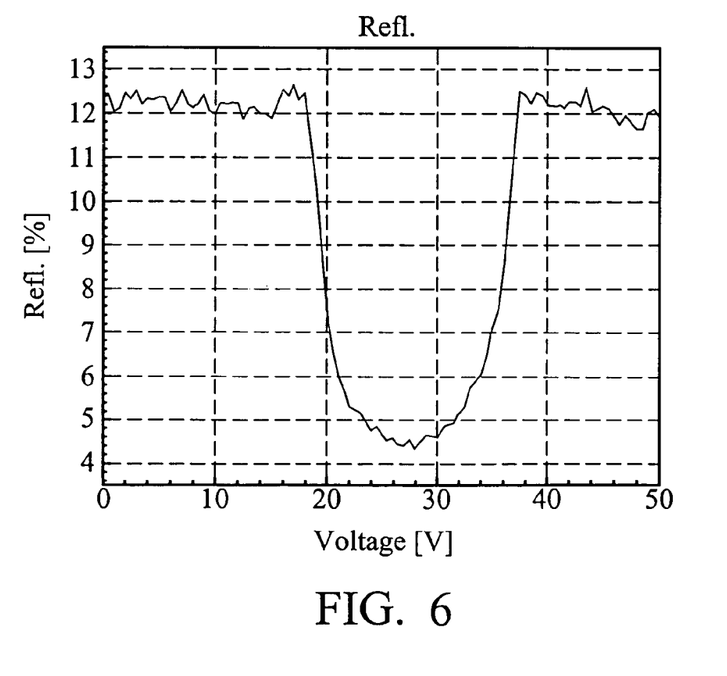
FIG. 6 is a graph plotting reflectivity against voltage of a display as disclosed in Example 20 at a measured reflected wavelength of 560 nm.

The liquid crystal composition (F) with a selectively reflected wavelength 560 nm was obtained by uniformly mixing 88 parts by weight of a commercially available nematic liquid crystal, RPD-88873 (available from Dic) and 12 parts by weight of the compound Q3 of the present invention prepared in Example 14. The relationship between reflectivity and operational voltage of the resulting composition was distinguished as in Example 15, and the result is shown in FIG. 6.

The respective relative proportions of liquid crystal compound Q3 of the present invention prepared in Example 14 and various nematic liquid crystal as described in Examples 15 to 20 are shown in Table 2.

TABLE 2

Type of nematic liquid crystal and weight concentration of Q3 for Liquid crystal composition as described in Examples 15 to 20

| Liquid Crystal Composition | Nematic Liquid Crystal | Weight Concentration of Q3 (wt %) |
|---|---|---|
| A | ZLI-5100-100 | 10.0 wt % |
| B | ZLI-5200-100 | 13.52 wt % |
| C | ZLI-5400-100 | 12 wt % |
| D | MLC-6657-100 | 12.26 wt % |
| E | MLC-6700-100 | 11.49 wt % |
| F | RPD-88873 | 12.0 wt % |

The present invention has the following advantages.

The liquid crystal compounds according to the present invention have high HTP value resulting from the natural alcoholic structure with high specific rotation and numerous chiral centers thereof. Particularly, the HTP values of liquid crystal compounds having the structure of cinchonidine or quinine, such as compound C3 and Q3, exceed that of conventional liquid crystal compounds.

As well, core structures similar to those of liquid crystal are designed to join in the liquid crystal compounds according to the present invention. As a result, miscibility between the liquid crystal compounds and nematic liquid crystal is significantly improved. For that matter, there is still excellent miscibility when the liquid crystal compounds are added into a liquid crystal composition over 15 wt %.

Another advantage of the present invention is that the raw material, such as terpenol, borneol, cinchonidine, or quinine, of the liquid crystal compounds is generally available, since these natural alcohols resulting from optical activity, purity, and high HTP value thereof are used frequently industrially, presenting readily available large quantities. Compared to conventional liquid crystal compounds, manufacturing costs can be substantially reduced.

The method of preparing liquid crystal compounds according to the present invention comprises providing an organic acid compound having similar core structure to liquid crystal to react with a natural alcohol with optical activity having multi-ring structure to undergo esterification by easy synthesis step. Hence, the method according to the present invention is suitable for mass production of liquid crystal compounds.

Increasingly popular portable and outdoor-use reflective displays demand enhanced temperature dependance and resistance to light. The liquid crystal composition according to the present invention provides this high resistance to light and low temperature dependance, and, for this reason, it is very suitable for use in reflective display.

Liquid crystal compounds having the structure of cinchonidine or quinine, such as compound ·C1·C2·C3·Q1·Q2 and Q3 as described above, can be used to form cholesteric liquid crystal reflective polarizer or color filter by polymerization with reactive type liquid crystal.

Conventional liquid crystal compounds with lower HTP value must be used in increased amounts mixing with nematic liquid crystal to conform to LCD requirements. On the contrary, the doping amount of liquid crystal compounds according to the present invention used in the liquid crystal composition for LCD, such as TN-LCD, STN-LCD, and TFT-LCD, can be decreased resulting from the high HTP value thereof. For this reason, the manufacturing cost of the liquid crystal composition is reduced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. A liquid crystal compound with high helical twisting power having a formula (I), of:

or a formula (II), of:

wherein
A' comprises naturally occurring organic multi-ring alcoholates selected from alcoholates of cinchonidine, and quinine;
A comprises naturally occurring organic multi-ring alcoholates selected from alcoholates of terpenol, borneol, cinchonidine, and quinine;

$R_1$ is hydrogen, alkyl, thioalkyl, or alkyloxy group, wherein alkyl, thioalkyl, and alkyloxy group can be straight or branched and have 1 to 10 carbon atoms optionally substituted with at least one fluorine atom;

n is 1, 2, or 3; and

G is the same or different and is unsubstituted or substituted cycloalkyl, heterocyclic, aryl, heteroaryl, arylalkyl, or heteroarylalkyl group, and is optionally substituted with at least one fluorine atom, alkyl, or alkyloxy group.

2. The liquid crystal compound having formula (I) as claimed in claim 1, wherein $R_1$ is —$OC_6H_{13}$, n is 1, A is alcolholate of cinchonidine, and G is 3. The liquid crystal compound having formula (I) as claimed in claim 1, wherein $R_1$ is —$C_3H_7$, n is 1, A is alcolholate of terpenol, and G is 4. The liquid crystal compound having formula (I) as claimed in claim 1, wherein $R_1$ is —$OC_{10}H_{21}$, n is 2, A is alcolholate of cinchonidine, and G is 5. The liquid crystal compound having formula (II) as claimed in claim 1, wherein n is 1, A is alcolholate of terpenol, and G is 6. The liquid crystal compound having formula (II) as claimed in claim 1, wherein n is 1, A is alcolholate of borneol, and G is 7. A method for preparing liquid crystal compounds with high helical twisting power, comprising:

reacting an organic acid represented by a formula (III) of:

or a formula (IV) of:

and a natural alcohol with optical activity undergoing esterification to obtain a liquid crystal compound represented by a formula (I) of:

or a formula (II) of:

wherein

A' comprises naturally occurring organic multi-ring alcoholates selected from alcoholates of cinchonidine, and quinine;

A comprises naturally occurring organic multi-ring alcoholates selected from alcoholates of terpenol, borneol, cinchonidine, and quinine;

$R_1$ is hydrogen, alkyl, thioalkyl, or alkyloxy group, wherein alkyl, thioalkyl, and alkyloxy group can be straight or branched and have 1 to 10 carbon atoms optionally substituted with at least one fluorine atom;

n is 1, 2, or 3; and

G is the same or different and is unsubstituted or substituted cycloalkyl, heterocyclic, aryl, heteroaryl, arylalkyl, or heteroarylalkyl group, and is optionally substituted with at least one fluorine atom, alkyl, or alkyloxy group.

8. The method as claimed in claim 7, wherein the natural alcohol with optical activity reacting with the organic acid represented by a formula (III) comprises cinchonidine, quinine, or derivatives thereof.

9. The method as claimed in claim 7, wherein the organic acid is benzoic acid, cyclohexane carboxylic acid, biphenyl carboxylic acid, para-cyclohexane dicarboxylic acid, terephthalic acid, 4-n-hexyloxy-benzoic acid, 4-n-propyl-cyclohexanecarboxylic acid, 4'-decyloxy-biphenyl-4-carboxylic acid, or cyclohexane-1,4-dicarboxylic acid, and is optionally substituted.

10. The method as claimed in claim 7, wherein G is

11. A liquid crystal composition, comprising:

at least one liquid crystal compound represented by a formula (I) of:

or a formula (II) of:

at a ratio from 3 wt % to 30 wt %, based on the weight of the liquid crystal composition, wherein A' comprises naturally occurring organic multi-ring alcoholates selected from alcoholates of cinchonidine, and quinine;

A comprises naturally occurring organic multi-ring alcoholates selected from alcoholates of terpenol, borneol, cinchonidine, and quinine;

$R_1$ is hydrogen, alkyl, thioalkyl, or alkyloxy group, wherein alkyl, thioalkyl, and alkyloxy group can be straight or branched and have 1 to 10 carbon atoms optionally substituted with at least one fluorine atom;

n is 1, 2, or 3; and

G is the same or different and is unsubstituted or substituted cycloalkyl, heterocyclic, aryl, heteroaryl, arylalkyl, or heteroarylalkyl group, and is optionally substituted with at least one fluorine atom, alkyl, or alkyloxy group; and a liquid crystal at a ratio from 3 wt % to 97 wt %, based on the weight of the liquid crystal composition.

12. The liquid crystal composition as claimed in claim 11, wherein the at least one liquid crystal compound represented by formula (I) or formula (II) is at a ratio from 5 wt % to 20 wt %.

13. The liquid crystal composition as claimed in claim 11, wherein the liquid crystal is a liquid crystal used in TN-LCD, STN-LCD, SSTN-LCD or TFT-LCD.

14. The liquid crystal composition as claimed in claim 11, wherein the liquid crystal composition is used in preparation of reflective polarizer or color filter.

15. The method as claimed in claim 7, wherein the natural alcohol with optical activity reacting with the organic acid represented by a formula (IV) comprises terpenol, borneol, cinchonidine, quinine, or derivatives thereof.

* * * * *